(12) United States Patent
Horwitz et al.

(10) Patent No.: US 7,724,138 B2
(45) Date of Patent: May 25, 2010

(54) METHOD AND SYSTEM FOR TRACKING CLUSTERED ITEMS

(75) Inventors: Clifford A. Horwitz, Ontario (CA); William E. Davidson, Durham, NC (US)

(73) Assignee: Sirit Technologies Inc., Toronto (CA)

( * ) Notice: Subject to any disclaimer, the term of this patent is extended or adjusted under 35 U.S.C. 154(b) by 0 days.

(21) Appl. No.: 11/966,663

(22) Filed: Dec. 28, 2007

(65) Prior Publication Data

US 2008/0100445 A1 May 1, 2008

Related U.S. Application Data

(63) Continuation of application No. 09/464,071, filed on Dec. 16, 1999, now Pat. No. 6,496,806, and a continuation of application No. 10/318,190, filed on Dec. 13, 2002, now Pat. No. 7,336,152.

(51) Int. Cl.
G08B 13/14 (2006.01)
G06Q 10/00 (2006.01)

(52) U.S. Cl. ............ 340/572.1; 340/10.32; 705/28

(58) Field of Classification Search ............ 705/28, 705/29; 340/10.1, 10.32, 572.1
See application file for complete search history.

(56) References Cited

U.S. PATENT DOCUMENTS

| | | | |
|---|---|---|---|
| 3,940,765 A | 2/1976 | Grafinger et al. | |
| 4,688,026 A | 8/1987 | Scribner et al. | |
| 4,897,859 A | 1/1990 | Tsukamoto et al. | |
| 5,565,858 A | 10/1996 | Guthrie | |
| 5,673,037 A | 9/1997 | Cesar et al. | |
| 5,771,561 A | 6/1998 | Hofele | |
| 5,780,826 A | 7/1998 | Hareyama et al. | |
| 5,804,810 A | 9/1998 | Woolley et al. | |
| RE36,109 E | 2/1999 | Kipp | |
| 5,886,634 A | 3/1999 | Muhme | |

(Continued)

FOREIGN PATENT DOCUMENTS

FR 2 764 077 A1 12/1998

(Continued)

OTHER PUBLICATIONS

"Barcode's Bane?"; Traffic World, vol. 7, No. 250; pp. 38+; May 19, 1997.

(Continued)

*Primary Examiner*—Andrew Joseph Rudy
(74) *Attorney, Agent, or Firm*—Fish & Richardson P.C.

(57) ABSTRACT

A method and system for tracking each item in a cluster of items. Each item has an associated item ID. The method and system involve the following steps. Storing a plurality of item records. The plurality of item records includes, for each item in the cluster of items, an associated item record for storing the associated item ID for the item. Each item record in the plurality of records is then linked to the other item records in the plurality of item records. Using the associated item record for each item in the threshold number of items, and the link between each item record and the other item records, the item records for the associated item ID of each item in the cluster that are not in the threshold number of items are determined.

10 Claims, 9 Drawing Sheets

U.S. PATENT DOCUMENTS

| | | | |
|---|---|---|---|
| 6,026,378 | A | 2/2000 | Onozaki |
| 6,396,438 | B1 * | 5/2002 | Seal ........................... 342/127 |
| 6,456,239 | B1 * | 9/2002 | Werb et al. .................... 705/28 |
| 6,496,806 | B1 * | 12/2002 | Horwitz et al. ............... 705/28 |
| 6,876,977 | B1 * | 4/2005 | Marks ......................... 705/26 |
| 7,098,793 | B2 | 8/2006 | Chung |
| 7,424,439 | B1 * | 9/2008 | Fayyad et al. ................. 705/10 |
| 7,545,256 | B2 * | 6/2009 | O'Toole et al. ............ 340/10.2 |

FOREIGN PATENT DOCUMENTS

| | | |
|---|---|---|
| JP | 2001-233410 | 8/2001 |

OTHER PUBLICATIONS

Office Action issued in corresponding Canadian Application No. 2,394,361; Feb. 28, 2008; 6 pages.

Codd, E.F. "A Relational Model of Data for Large Shared Data Banks" Communications of the ACM, vol. 13, No. 6, Jun. 1970, pp. 377-387.

Notification of Transmittal of the International Search Report of the International Searching Authority of Application No. PCT/CA 00/01537 filed Dec. 15, 2000, and mailed Nov. 12, 2002 by Maria Rodriguez Novoa (7 pages).

Office Action of the Canadian IP Office for Canadian Application 2,394,361, filed Dec. 15, 2000, and mailed by Russell Reyneke on Jul. 13, 2004 (4 pages).

Office Action of the Canadian IP Office for Canadian Application 2,394,361, filed Dec. 15, 2000, and mailed by Russell Reyneke on Jan. 4, 2006 (8 pages).

* cited by examiner

METHOD AND SYSTEM FOR TRACKING CLUSTERED ITEMS

CLAIM OF PRIORITY

This application is a continuation of and claims priority under 35 USC §119(e) to U.S. patent application Ser. No. 09/464,071, filed on Dec. 16, 1999, and is now known as issued U.S. Pat. No. 6,496,806, issued Dec. 17, 2002, the entire contents of which are hereby incorporated by reference; and U.S. patent application Ser. No. 10/318,190 now U.S. Pat. No. 7,336,152, filed on Dec. 13, 2002, and now published as Publication No. 2003/0083964, published May 1, 2003, the entire contents of which are hereby incorporated by reference.

FIELD OF THE INVENTION

The present invention relates generally to tracking systems, and, more particularly, relates to a method and system for accurately tracking items that are moved, handled or processed in clusters, such as boxes, bags, containers and pallets, as well as other suitable means.

BACKGROUND OF THE INVENTION

Tracking systems are used in a wide variety of contexts to provide many different types of information. This information generally regards the location and availability of items being tracked. More specifically, this information includes, but is not limited to, information regarding (1) items received for purchase order reconciliation and accounts payable release purposes; (2) movement of items, storage of items or simply finding items within a facility for inventory control purposes; (3) monitoring the processing of items to ensure that each item has gone through the proper stages of processing; and (4) shipping of items to ensure order correctness and to trigger billing. This kind of information is required in warehouses, distribution centers, manufacturing facilities, service depots, postal sorting facilities, airports, retail and wholesale stores, as well as in any facility or network of facilities, such as a trucking system, which must accurately handle some volume of items.

For example, in a warehouse it is important to keep track of what items are in the warehouse, as well as where items are located within the warehouse. A tracking system in a warehouse should preferably provide information regarding where particular items are stored in the warehouse and how many are stored in the warehouse, as well as information regarding when items are received into the warehouse and when they leave the warehouse.

Different systems have been devised for keeping track of items. This information may, for example, be recorded manually. Alternatively, each item being tracked may be marked with a bar code. In either case, the data must be entered into a central database in order to be useful in tracking items. Bar code scanning automates the entry of data into the central database. Whether a bar code or manual system is used, warehouse personnel must have a clear line of sight to the label of each item in order to either enter the item information manually or to scan the item information into the system using a bar code, and each warehouse worker must also read the labels one at a time. In many cases, packaging of items in boxes, crates, bags or other containers may make this operation very operator-intensive and inaccurate.

Radio frequency identification systems provide a number of advantages over other identification systems, such as manual or bar code systems. In radio frequency identifications systems, information for each item is automatically gathered—warehouse personnel are not required to enter this information. In addition, reading distances can be longer, the tags can be hidden for security reasons, multiple tags can be read simultaneously, and, in the case of read/write tags, information can be stored on the tags, such as the purchase order number or the destination of the item. The foregoing are just some of the advantages of RFID tags.

A typical radio frequency identification system consists of transponders or tags, and an interrogator or reader (or multiple interrogators). The tag may be a single integrated circuit chip bonded to a flat, printed antenna, or could be a complex circuit including a battery and sensors for sensing temperature, position, orientation or other characteristic. RFID tags may be attached to items in many different ways, including being bolted to the item or simply glued to the inside of existing packaging or labeling. RFID tags may be encoded with user-defined data at the time of use, pre-coded with a numbering system at the time of tag manufacturing, or a combination of both approaches may be used.

For a number of reasons, it is preferable to use tags that do not require batteries—such tags are commonly referred to as passive tags and typically receive whatever power they require from an external power source. Passive tags are typically less expensive, require less maintenance, and have extended operating environmental ranges.

In the case of a passive tag, the interrogator will first activate the tag by generating an electromagnetic field of a given frequency. Such an electromagnetic field can be generated, for example, by supplying an alternating electrical current at a given frequency to a coil for low frequency near field systems—commonly called inductively coupled systems—or to an RF antenna for far field higher frequency systems.

The tag includes an antenna—which could be dipole for far field systems or a coil for inductive systems—tuned to the frequency of the electromagnetic field generated by the interrogator. The electrical current thus generated is used to power the tag. Data is generally sent to the tag by modulating the interrogator-generated electromagnetic field, which is commonly called the exciter or illuminating field. The tag can send data back to the interrogator either by transmitting with its own transmitter at a separate frequency from the illuminating field using the antenna, or by modulating the illuminating field by changing the loading of the tag's antenna in what is commonly called a back scatter system. Then, either the new electromagnetic field caused by the tag, or the disturbances in the interrogator's illuminating field caused by the tag's back scatter system, is detected by the interrogator. The data from the tag is then decoded, enabling the tag and the item to which the tag is attached to be identified, and, where the tag is a read/write tag, enabling new or incremental data to be written to the tag.

In a typical RFID tagging application, items to be tracked are tagged and gates with interrogators are installed at various key points in the facility that are significant in the tracking of item. For example, in warehouses, interrogator gates are typically installed at shipping docks in order to read the tags of items before they are loaded onto trucks. This system, however, can lead to many problems.

First, many gates or interrogators must be installed for this system. A typical distribution centre type installation might have more than 30 loading docks, each requiring a separate gate with interrogator. A typical manufacturing or sorting plant type installation might have a huge number of internal checkpoints requiring gates with interrogators in order to track the items and the processing that is applied to each item.

Interrogators are very expensive. Thus, an application that requires a lot of interrogators is very expensive.

Second, interrogator gates restrict the freedom of movement of forklifts and people, as well as reducing the floor space available to receive items. This is particularly a problem as gates are likely to be concentrated around the dock doors where space is at a premium—areas adjacent to the dock doors are frequently used as staging areas for temporary storage of items that are being moved onto trucks. The gate spacing and dimensions required to read the tags at the distance, speed, orientation and quantity that items are expected to go through the gate may also greatly restrict movements of the items. This tends to slow down operation and reduce read accuracy, and also makes it likely that the gates and the interrogators will sustain damage.

Typically, a large number of items are loaded on or off a truck or are moved through a facility at a time. For example, it is not uncommon to have 500 tagged items in a bag or box, or on a pallet, being passed through an interrogation gate at any one time. In an anti-collision RFID system, both the interrogator and the tags are specially designed to enable the interrogator to read multiple tags concurrently. In non-collision RFID systems, by way of contrast, only one tag can be in a field at a time in order to ensure a good read. This requirement of anti-collision RFID systems, that the interrogator and tags be designed to enable multiple tags passing through the gate to be read at the same time, slows down the read rate of the interrogators, greatly reduces the accuracy in reading tags, reduces the distances at which the tags can be read, restricts the selection of tag types and frequency, and, in general, raises the question of whether all the tags have been read.

In addition, there may be items stored immediately beside the gate through which a forklift carrying many tagged items is passing, and another interrogator gate may be as little as four feet away at the next loading dock. The very large number of tagged items simultaneously passing through the interrogator gate, the close proximity of other tags that are not passing through the interrogator gate, and the close proximity of another interrogator gate that generates its own electromagnetic field to activate tags passing therethrough, may interfere with an accurate read. Specifically, each interrogator gate is likely to read tags that it should not read—tags that are not passing through the interrogator gate—and to not read tags that it should read—tags that are passing through the interrogator gate.

The way in which items are packed in a container—whether a box, crate, bag or pallet—helps to determine both the orientation of the tag, and the proximity of each tag to other tags. The orientation of a tag relative to the interrogator's antenna is important as a tag whose antenna's polarization is at right angles to that of the interrogator's antenna will be invisible to the interrogator regardless of the distance separating the interrogator from the tag. The proximity of tags to each other is important as two tags that are in close proximity to each other and whose antennae are aligned will steal power from each other, thereby greatly reducing the read range of the two tags as compared to a single tag.

The composition or physical nature of the item being tagged may also significantly reduce the read range and accuracy of the RFID tagging system. An item with a high moisture or metal content can absorb or mask interrogator fields at certain frequencies such that tagged items in the centre of the container, which are surrounded by other items having a high moisture or metal content, cannot be read at all regardless of how slowly they are passed through a gate, or how distant the interrogator is. This may require interrogator fields to operate at frequencies that are inappropriate to the particular application. For example, high frequency interrogator fields are suitable for far field usage (long range applications). However, a bag of water will completely absorb frequencies high enough for far field usage, thereby necessitating the use of inductively coupled tags in situations where such a system is unsuitable for the read range and data speeds required. A person walking past the antennae of either the tags or the interrogator at the time of the read will have the same effect.

The proximity of the interrogator gates to one another, or to radio systems such as RF LAN systems, will also reduce the range and accuracy of the system, and may create confusion between the RF LAN system and the interrogator system. Even a simple, unintentional reading of a tag by a nearby interrogator gate, through which the item is not passing, can destroy the integrity of the data. As a result, tag interrogation systems cannot, in most situations, guarantee a read of all tags at all times. If the accuracy of the interrogation cannot be guaranteed with a high degree of certainty, then the system cannot be used without manual override or intervention. In other words, if it cannot be; determined with confidence that every tag has been read, then manual intervention will be required on every read.

In addition to the foregoing problems, there is an additional problem that many sites within a warehouse are not suitable for installing interrogators, and the mounting problems can be almost as varied as the number of interrogators required, greatly adding to the cost of an already expensive gate or interrogator.

Accordingly, a radio frequency identification system that reduces the number of interrogators required, does not require the interrogators to be located in areas where space is at a premium, such as the docking area, and can better distinguish items that are being moved from items that are not being moved, is desirable. Indeed, a system that can read multiple tags with a high degree of accuracy is required to make an RFID system viable for a wide range of applications.

SUMMARY OF THE INVENTION

An object of the present invention is to provide an improved method of accurately tracking each item in a cluster of items.

In accordance with an aspect of the present invention there is provided a method for tracking each item in a cluster of items. Each item has an associated item ID. The method comprises the following steps:

(a) storing a plurality of item records—the plurality of item records includes, for each item in the cluster of items, an associated item record for storing the associated item ID for the item;

(b) linking each item record in the plurality of item records to the other item records in the plurality of item records;

(c) reading the associated item ID from each item in a threshold number of items in the cluster of items;

(d) determining the associated item record for each item in the threshold number of items using the associated item ID from each item read in step (c); and, (e) determining the associated item record for the associated item ID of each item in the cluster and not in the threshold number of items from the item records determined in step (d) using the link established in step (b).

Preferably, step (a) comprises storing a unique cluster ID for the cluster of items in a cluster record; step (b) comprises linking the cluster record to each item record in the plurality of item records; and, step (e) comprises determining the cluster record linked to each item record determined in step (b)

and then determining each item record associated with the cluster ID and not determined in step (d).

In accordance with another aspect of the present invention there is provided a system for tracking each item in a cluster of items. Each item has an associated item ID. The system includes means for performing the following steps:

(a) storing a plurality of item records—the plurality of item records includes, for each item in the cluster of items, an associated item record for storing the associated item ID for the item;

(b) linking each item record in the plurality of item records to the other item records in the plurality of item records;

(c) reading the associated item ID from each item in a threshold number of items in the cluster of items;

(d) determining the associated item record for each item in the threshold number of items using the associated item ID from each item read in step (c); and, (e) determining the associated item record for the associated item ID of each item in the cluster and not in the threshold number of items from the item records determined in step (d) using the link established in step (b).

Preferably, step (a) comprises storing a unique cluster ID for the cluster of items in a cluster record; step (b) comprises linking the cluster record to each item record in the plurality of item records; and, step (e) comprises determining the cluster record linked to each item record determined in step (b) and then determining each item record associated with the cluster ID and not determined in step (d).

In accordance with a further aspect of the present invention there is provided a data structure for storing information regarding each item in a cluster of items, each item having an associated item ID. The data structure comprises a set of item-specific data objects for storing information regarding each item in the cluster of items, and a linking means for linking each item-specific data object in the set of item-specific data objects to the other item-specific data objects in the set of item-specific data objects. For each item in the cluster of items the set of item-specific data objects includes an associated item-specific data object for storing the associated item ID of the item.

BRIEF DESCRIPTION OF THE DRAWINGS

A detailed description of the preferred aspects of the invention are provided herein below with reference to the following drawings, in which:

FIG. 5, in a top plan schematic view, illustrates the warehouse environment of FIG. 4; and, FIGS. 6 and 7 are flow charts illustrating the steps of a method of tracking a cluster of items through storage, processing, and shipping stages in accordance with a further preferred aspect of the present invention.

DETAILED DESCRIPTION OF THE PREFERRED EMBODIMENTS OF THE INVENTION

Figure 1:
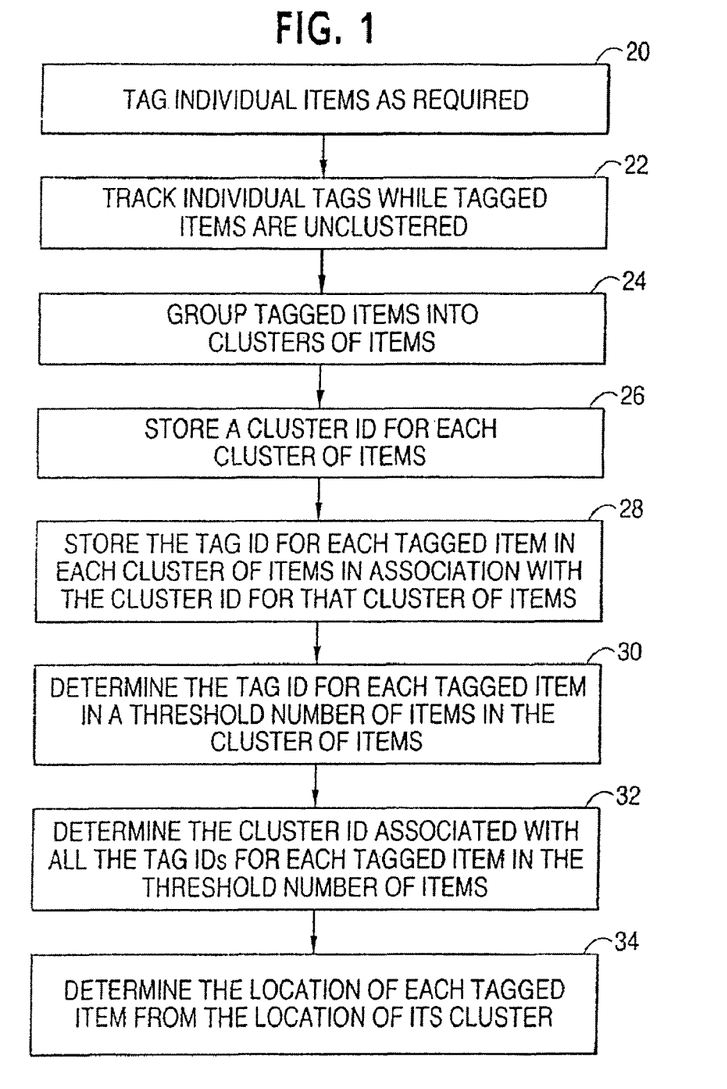
FIG. 1, is a flow chart illustrating the steps of a method of tracking a cluster of items in accordance with a preferred aspect of the present invention.

Referring to FIG. 1, a method of tracking a cluster of items in accordance with a preferred aspect of the invention is illustrated in a flow chart. A tag is attached to each item. In step 20 of the method of the flow chart of FIG. 1, individual items are individually tagged if not already tagged. Each tag is configured to transmit a signal representing a tag ID. In the case of a read/write tag, additional information may also be stored on the tag. Thus, when tagged, each item is identified by a unique tag ID. Each tag ID is recorded in a centralized database along with information regarding the tagged item.

In step 22, these individual tags are tracked using conventional methods before the tagged items have been clustered. Specifically, individual items moving along assembly lines or conveyors are tracked by interrogator gates through which the items pass. These interrogator gates must be able to read and arbitrate between many different tag passing through the gate at the same time.

In step 24, several items are grouped into a cluster according to the normal packaging method for that item (i.e. bag, box, crate, tote, pallet etc.). In step 26, a cluster ID is saved for each cluster. In step 28, the tag ID for each tagged item in the cluster is stored in association with the cluster ID. Additionally, if read/write tags are used, the cluster ID may be stored in a cluster field of each tag.

In reading a cluster of tagged items with an interrogator, not all tags from the cluster will be read due to orientation, shielding, absorption, interference, etc. as described above in the background portion of the specification. In addition, extra tags may be read that are not part of that cluster. They could belong to an adjacent cluster or to adjacent tagged items that are not yet clustered. Each tag ID that is read is checked in the database for membership in a cluster. If the read contains more than a threshold number of tags belonging to a particular cluster, then that cluster is said to be present. In step 30, the above process is repeated until the threshold number of tags are read. Item ID tags which do not belong to a cluster or do not meet the threshold requirements for identifying a new cluster ID are ignored or logged for post processing of error statistics or for refining system operation.

The threshold number of items corresponds to the minimum number of tags that must be read in order to ascertain with an acceptable level of certainty that the cluster has been read. The threshold number will vary depending on the context in which the method is implemented. In order to increase read rates and speed, the threshold number should be kept low, while in order to ensure accuracy and certainty, the threshold should be kept high. The physics of the situation, and the practicality of reading tags in the particular application, will determine the balance between acceptable read rates and certainty.

In contexts in which a high degree of certainty is required, or in which speed of the read is not an important factor, the threshold number may be set quite high. In contrast, in contexts in which read time is to be kept as short as possible, and in which a lower degree of confidence that a cluster has been read is sufficient, the threshold number may be quite low. The threshold number may be as low as 1, in which case the threshold number of items will include only a single item that will be used to determine the cluster ID. However, in order to provide some error correction through redundancy, the threshold number is preferably greater than 1.

The particular tagged items that make up the threshold number of items in the cluster of items is unimportant and will probably vary from read to read. It is not the identity of the threshold number of items, but the magnitude of the threshold number that is important.

In step 32, the cluster ID associated with all of the tag IDs in the threshold number of items is determined. In step 34, the location of each tagged item is determined by determining the location of the cluster that contains it.

Antennae can always be designed and installed to read tags that are packed to have a fixed orientation. This is not the case, however, with randomly oriented tags. Notwithstanding this, reading a subset of tags to identify a complete cluster allows for accurate reading even when the tags are randomly oriented as packaged, such as where loose items are stored in a box. Further, reading a subset of tags to identify a cluster allows all of the items in the cluster to be accurately identified even when individual items in the centre of the cluster cannot be read because of the material composition of other items surrounding the items that cannot be read. These surrounding items may absorb, block or reflect the interrogator's field.

The system does not change the write feature of a tag. Specifically, tags can still be written to while the system is tracking and reading items on an individual basis before the items are clustered. Once the item is packaged in the cluster, a write to all items in the cluster cannot be guaranteed, as not all of the tags may be addressable. However, the cluster of items can be viewed as a set of redundant memories in which the data to be written is the same for all items in the cluster. The data is then carried with the cluster by a subset of the tags, although not necessarily by all of the tags. When the items are unpacked, and unclustered, the data can then be reassigned to each individual tag before the items are again handled individually.

FIGS. 2 to 5 relate to the implementation of aspects of the present invention in the context of a warehouse. These figures provide illustrative detail on how the invention may be implemented in this one context. It will, however, be appreciated by those skilled in the art that the invention may be implemented in many different contexts. For example, aspects of the invention could be implemented for tracking parcels in a trucking firm, mail in a sorting station, money bag deposits at an amusement park, cars in an assembly line, or luggage at an airport.

It will be further appreciated by those skilled in the art that in order to spread the costs of a system implementing the invention as widely as possible, it would be advantageous to implement a system in accordance with the invention in several different connected facilities. For example, a supply chain for items could encompass many different facilities including a manufacturing facility—be that a farm or electronics circuit foundry, distribution and transportation facilities for receiving the items following manufacture, post processing facilities, a wholesale store, trucks for shipping the items from the wholesale store, and finally retail stores. A system implemented throughout this supply chain could track items all the way from manufacture to sale through a retail store. Different clusters may be formed and broken up at different stages along this chain of distribution.

Figure 2:
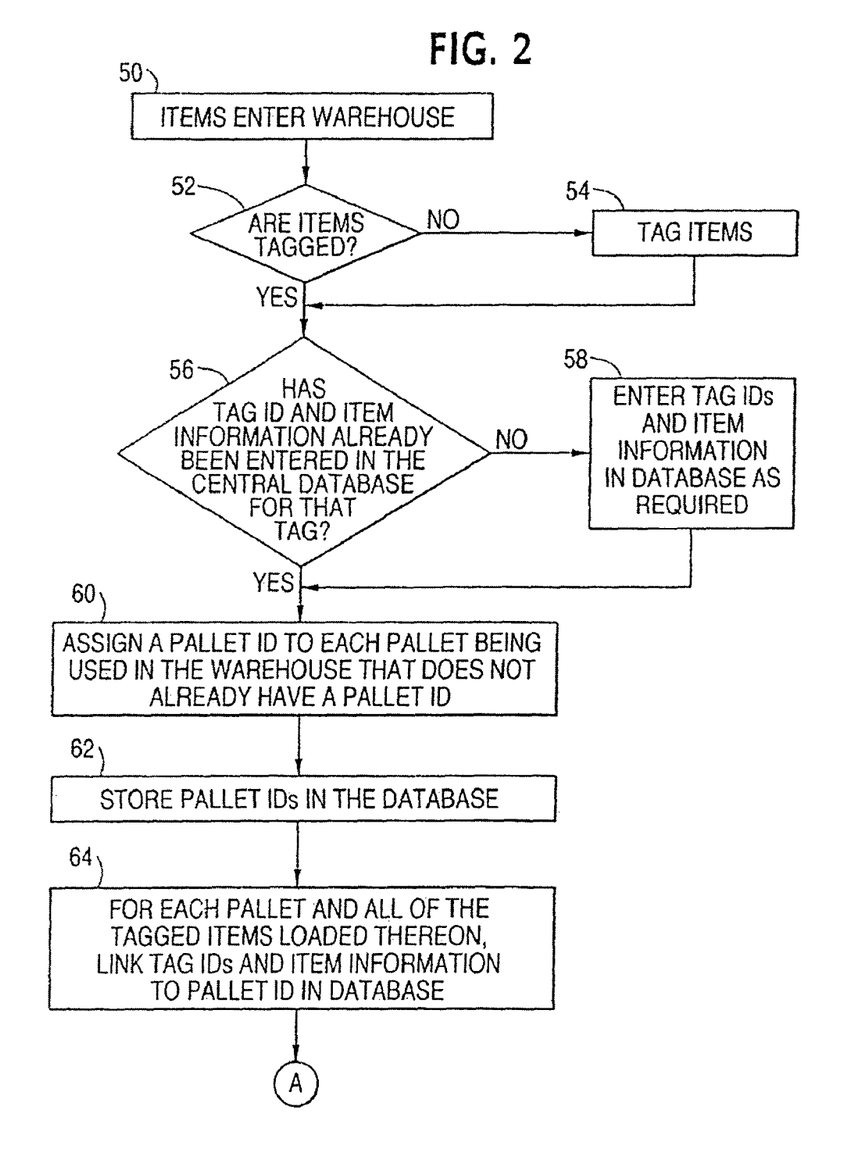
FIGS. 2 and 3 are flow charts illustrating the steps of a method of tracking a cluster of items in a warehouse in accordance with a further preferred aspect of the present invention.

Referring to FIG. 2, the initial clustering steps of a method of tracking a cluster of items within a warehouse are illustrated by means of a flowchart. In step 50, items enter the warehouse. If the items are not already tagged, then query 52 returns the answer "NO" and the items are tagged in step 54. If tag data, including the tag IDs and information regarding each of the tagged items, has not already been entered into the central database for the warehouse, then query 56 returns the answer "NO" and this tag data is entered into the central database in step 58. Step 58 will be unnecessary where tag data has already been entered into the central database, in which case query 56 will return the answer "YES" and the method will bypass step 58 and proceed directly to step 60. This is likely to be the case when the tagged items were already tagged before being received into the warehouse. Preferably, the items are already tagged and clustered according to a normal packaging method, before the items are received into the warehouse.

Each of the pallets being used in the warehouse has an associated pallet ID, or is assigned a pallet ID in step 60. These pallet IDs are stored in the central database in step 62. In step 64, the database record for each item in a group of tagged items that are to be loaded onto a pallet is linked to the database record for the pallet ID for that pallet before the item is put on the pallet. This pallet is then shrink-wrapped to hold all of the tagged items on the pallet.

Figure 3:
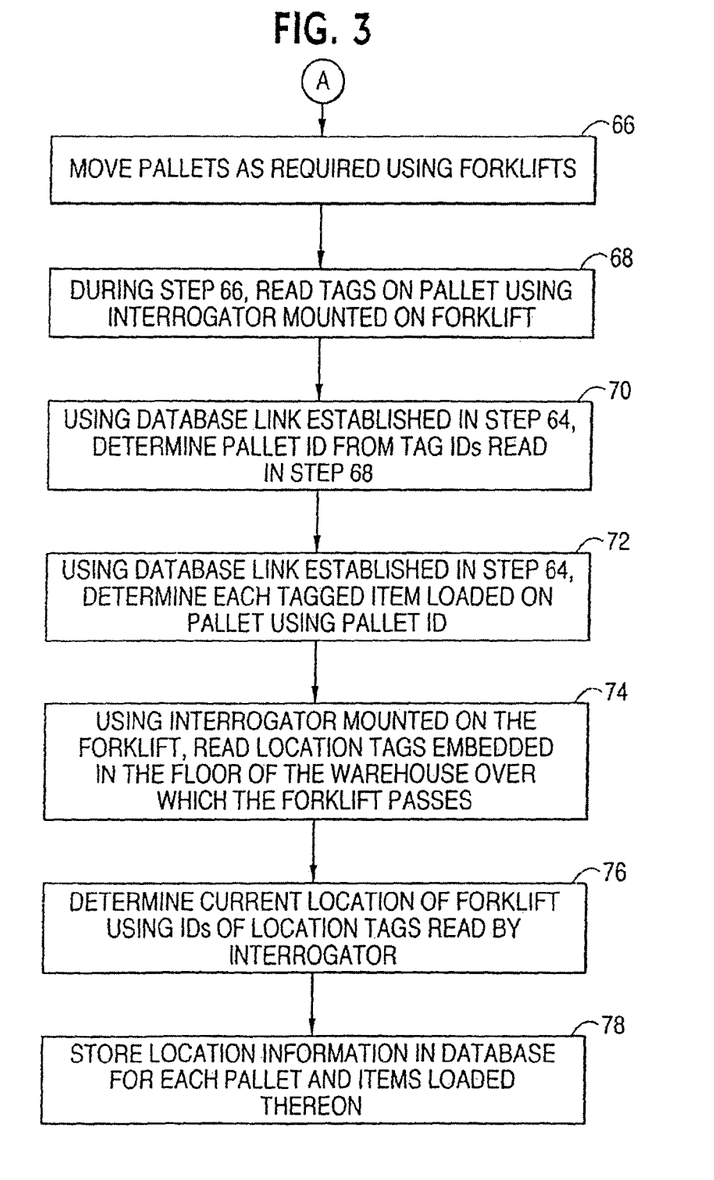

Referring to FIG. 3, subsequent steps of moving and tracking the cluster of items after the clustering steps of the method of FIG. 2 are illustrated by means of a flowchart. Once on the pallet, the group of tagged elements may be moved by suitable equipment such as forklifts. According to the preferred embodiment of the invention shown in FIG. 4, each forklift includes an interrogator. The pallet may be viewed as an item with many tags. While it is possible that some of the tags may not be read by the interrogator mounted on the forklift, it is virtually certain that, given the close proximity and controlled relationship of the forklift to the pallet, many of the tags will, in fact, be read by this interrogator. In step 66 of FIG. 3, the pallets are moved by forklifts, each of which has at least one interrogator mounted thereon. While being transported by the forklift in step 66, some of the tags of items on the pallet are read by the interrogator in step 68. Then, in step 70, the pallet ID for the pallet carried by the forklift is determined using the tag IDs read in step 68. Specifically, the pallet ID can be determined using the link stored in the database in step 64 between the pallet ID and the tag IDs of the tags of the items loaded on the pallet. Once the pallet ID has been determined, the item information and tag ID for each tagged item is located in the database in step 72 using the pallet ID and the link of step 64.

Where read/write tags are used, step 70 may be unnecessary in that the pallet ID can be determined by the interrogator mounted on the forklift in step 68. Specifically, where read/write tags are used, the pallet ID can be written directly into a pallet field in all of the tags of the items carried by the pallet. In step 68, the interrogator mounted on the forklift reads some, although not necessarily all, of the tags of the items carried by the pallet. In the case of read/write tags, the pallet ID is then determinable by checking the pallet field for each of the tags read by the interrogator in step 68. Accordingly, recourse to the database is not required to determine the pallet ID from the tag IDs read by the interrogator as the information read by the interrogator will include the pallet ID. Unless all of the tag IDs are stored on each tag, however, recourse to the database will still be required to determine the tag and item information for each of the items loaded on the pallet. Say, for example, that the pallet field for each of the tags in the tag subset reads "XYZ", indicating that the pallet being moved by the forklift is pallet XYZ. Then, using the centralized database on which the tag IDs for each pallet are stored, any remaining tags in the cluster of items can be determined. In the case of non-writeable tags, after the tags in a threshold number of items of a cluster of items have been read by the interrogator mounted on the forklift, the centralized database is first used to determine the identity of the pallet, and then used to determine the identity of the remaining tags and their respective items that had not been read by the interrogator on the forklift.

The interrogator mounted on the forklift can also be used to determine the location of the forklift, thereby determining the location of tagged items being carried by the forklift. Location tags are embedded in the floor of the warehouse to mark reference locations in the warehouse. Each of these location tags has a location ID, which is stored in the database together with the location of the location tag. When a forklift passes over a location tag buried in the floor, the signal from the interrogator mounted on the forklift activates the location tag. The location tag then broadcasts its location ID back to the interrogator in step 74 of the flowchart of FIG. 3. Then, in step 76 of the flowchart of FIG. 3, the location of the location tag, and hence the location of the forklift and the pallet carried by the forklift, is determined from the database using the location tag ID. The location information for the pallet is then stored in the centralized database. Alternatively, as will be discussed below in connection with the embodiments of the invention shown in FIG. 4, the forklift may include different interrogators for reading the tags of the tagged items on the one hand, and the location tags on the other.

Figure 4:
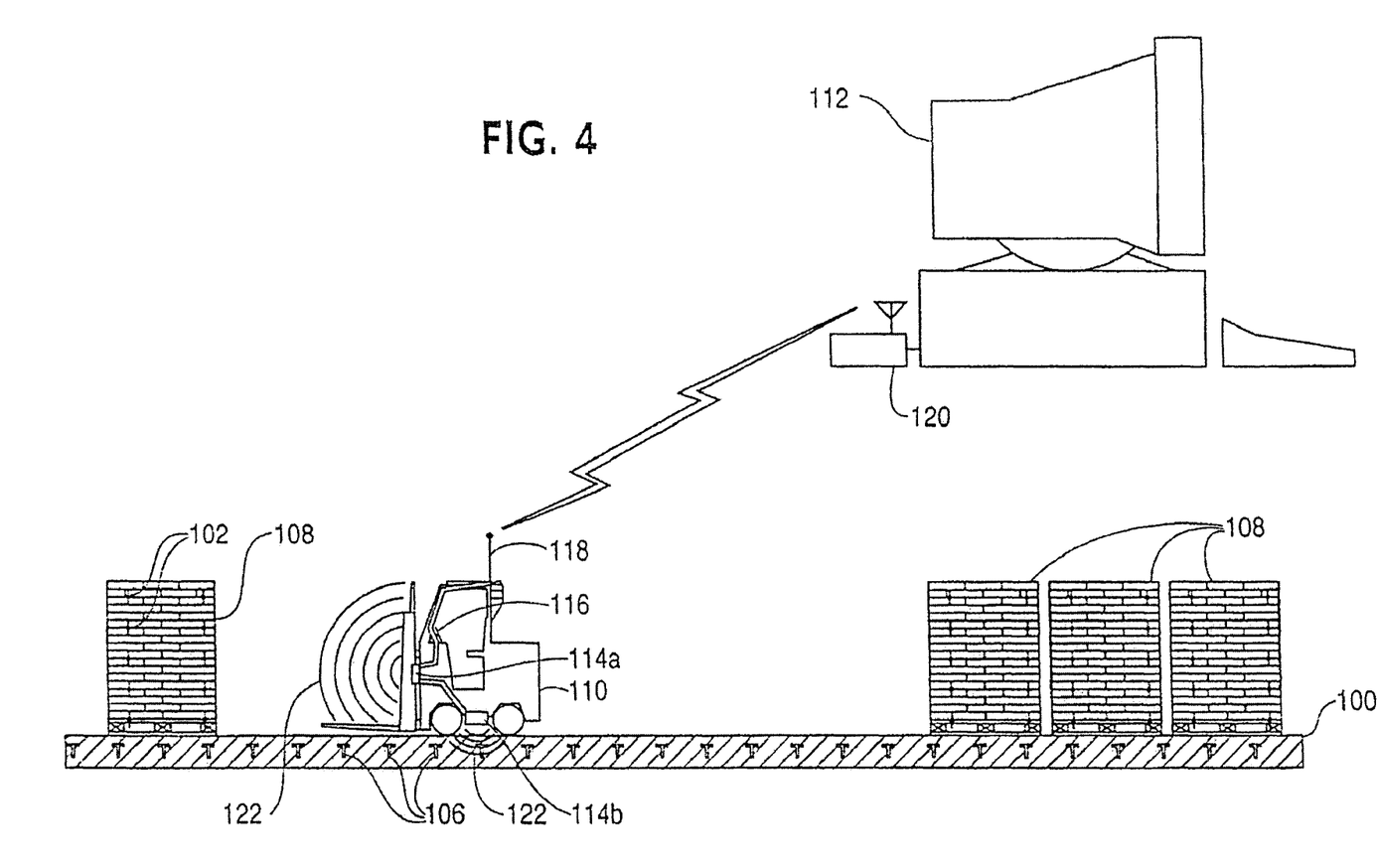
FIG. 4, in a side schematic view, illustrates a warehouse environment in which a system for tracking a cluster of items has been implemented in accordance with a preferred embodiment of the invention.
Figure 5:
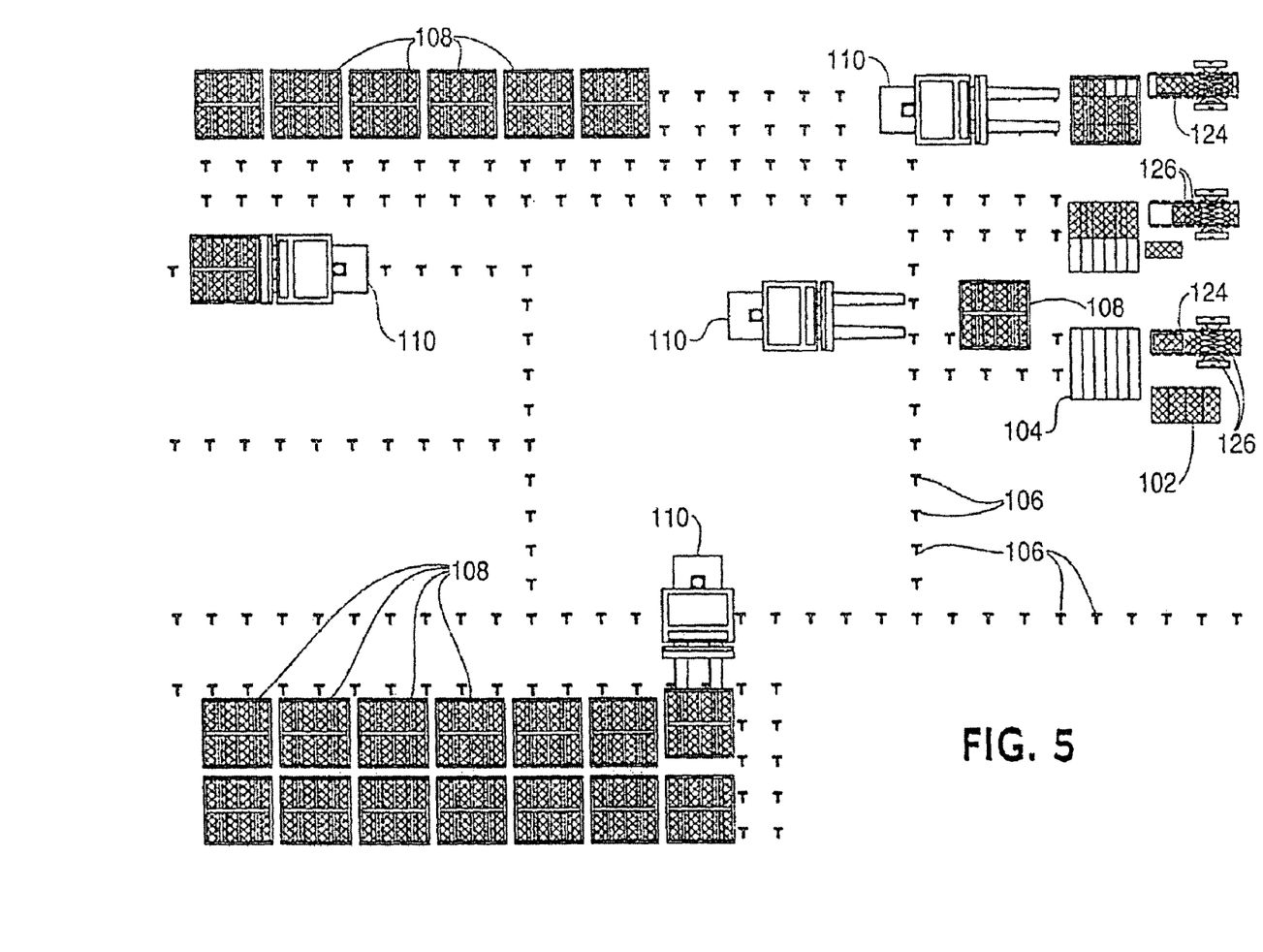

Referring to FIG. 4, there is illustrated in a side schematic view, a warehouse environment in which a system for tracking a cluster of items has been implemented in accordance with a preferred embodiment of the invention. FIG. 5, in a top plan schematic view, shows the warehouse environment of FIG. 4. Referring to FIG. 5, tagged items 102 are first moved onto the warehouse floor 100 by conveyor belts 124. These conveyor belts 124 include conveyor interrogators 126 that read the tag IDs of the tagged products moving along the conveyor belts. The conveyor belts 124 discharge the tagged items 102 onto empty or partially loaded pallets 104. As each tagged item 102 is discharged onto a pallet 104, the tag ID of the tagged item 102 is read by the conveyor interrogator 126. This tag ID is then added to a list of all of the tag IDs of all of the tagged items 102 loaded onto a particular pallet.

When tagged items 102 have been grouped together on a pallet 104 to form a full pallet 108, the pallet ID of the full pallet 108, and the tag IDs for each of the tagged items 102 loaded on the full pallet 108, is saved in a warehouse database 112 (shown in FIG. 4). These records are linked together within the database 112 to enable the pallet ID to be determined from the tag IDs, and to enable the tag IDs to be determined from the pallet ID.

The fully laden pallet 108 can then be moved by a forklift 110. As shown in FIG. 4, the forklift 110 has two forklift interrogators 114. Specifically, the forklift 110 includes a forward-reading interrogator 114a and a downward-reading interrogator 114b. The forklift interrogators 114 are operated by the operator at an operator console 116 of the forklift 110. After forklift 110 picks up full pallet 108, the operator of forklift 110 can, via the operator console 116, activate the forward-reading interrogator 114a, thereby generating an electromagnetic field 122. Many of the tagged items 102 on the pallet 108 carried by the forklift 110 will fall within the electromagnetic field 122 generated by the forward-reading interrogator 114a, and, will, accordingly, be activated by the forward-reading interrogator 114a. The tags that are activated on the tagged items 102 loaded on the pallet 108 then generate a response signal that is received by the forward-reading interrogator 114a. The response signals thus received are then broadcast by a forklift transmitter 118 to a radio frequency modem 120 connected to the warehouse database 112. The warehouse database 112 can determine the pallet ID of pallet 108 carried by forklift 110 based on the tag IDs sent to the database 112 by the forklift transmitter 118. Once the pallet ID of pallet 108 has been determined, the tag IDS for each of the tagged items 102 loaded on the pallet 108 can be retrieved from the database, along with information regarding tagged items 102 themselves.

As best shown in FIG. 5, a large number of location tags 106 are embedded in the warehouse floor 100 along major forklift routes throughout the warehouse. The location tags 106 are arranged in a grid pattern in a storage areas of the warehouse floor 100, and may be embedded in shelving if shelving is used. As shown in FIG. 4, the operator of the forklift 110 can activate the downward-reading interrogator 114b via operator console 116. The downward-reading interrogator 114b generates an electromagnetic field 122 that activates the location tag 106 embedded in the warehouse floor 100 directly below the downward-reading interrogator 114b. When activated, the location tag 106 sends a response signal back to the downward-reading interrogator 114b. This response signal includes the tag ID of the particular location tag 106. The response signal is then sent back to the warehouse database 112 via the forklift transmitter 118 and radio frequency modem 120. The tag ID of the particular location tag 106, enables the database to pinpoint the location of the forklift 110, thereby determining the location of the pallet 108 and tagged items 102 loaded thereon.

The cluster ID along with any location tag that were identified in the same read are stored together with a time date stamp in a location list for each cluster ID that was determined as present in that read. The cluster location list provides the real-time trail of where a particular cluster is or has been. If the interrogator is mobile, such as on a forklift, then the interrogator ID simply identifies the forklift carrying the product and the location tag IDs identify the location in the facility. The location list will show the route of the cluster from, say, its storage location to a particular shipping dock and even the truck number where location ID tags are embedded in the truck. A spurious read of a cluster that the forklift drives past but is not carrying will simply add a location entry in that cluster's location list. That location entry becomes a confirmation of the cluster's static location by a passing forklift. This procedure then works for a very wide range of applications, from single items going down a conveyor belt past stationary readers with a cluster membership size of one and with interrogator ID providing location, to a system with interrogators on the forklifts capable of moving many clusters at a time with varying membership sizes and embedded location tags in the facility.

Figure 6:
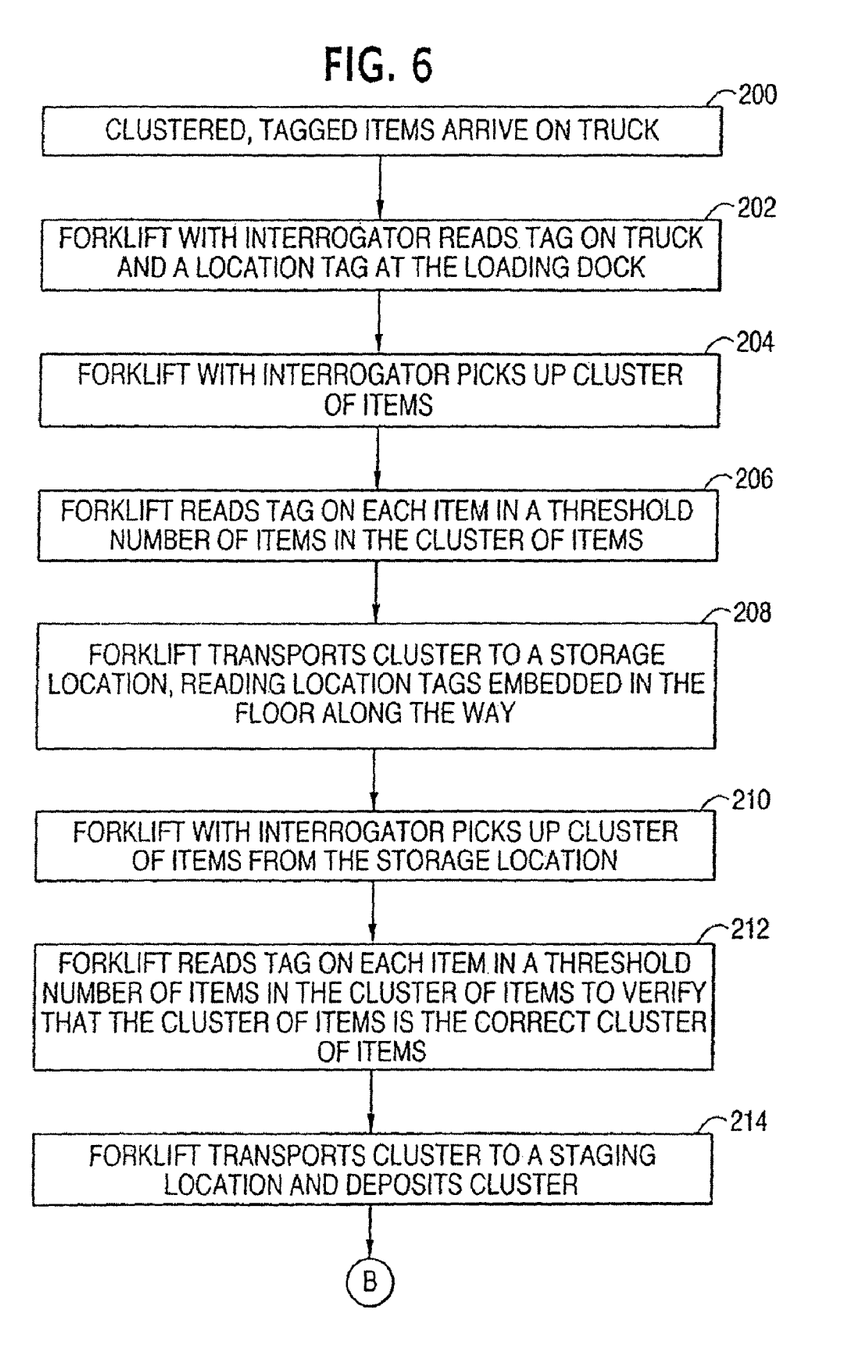

Referring to FIG. 6, the initial steps of a method of tracking a cluster of items through storage, processing and shipping stages in accordance with the further preferred aspect of the present invention, are illustrated by means of a flow chart. According to this aspect of the invention, the items arrive at a facility already grouped into clusters. Each of these clusters has a cluster ID, which has been stored in a central database of the system along with a list of items in that cluster ID, as well as the tag IDs for all of the items in the list. In step 200, the clustered and tagged items are brought to the facility by a truck. In step 202, a forklift with a portable interrogator reads a truck ID tag on the truck, and transmits the truck ID to the central database. In step 204, the forklift picks up the cluster of items, and in step 206, the forklift reads the tag ID from each tag on each item in a threshold number of items in the cluster of items and transmits tag IDs read to the central database. The forklift then moves to a storage location where the cluster of items is to be stored. While the forklift is moving to the storage location, the interrogator mounted on the forklift reads tags embedded in the floor and transmits the information read to the central database. In step 208, the forklift transports the cluster to the storage location and deposits the cluster there. At the same time, the interrogator on the forklift reads the location tag at the storage location and transmits this information to the central database.

At step 200, the central database had already recorded the cluster ID, and all of the items in the cluster, as well as their tag ID's as this information was transmitted to the central database when the clusters were originally formed. Accordingly, after completion of step 206, the central database has recorded each item received, as the cluster ID can be determined from the threshold number of items read, and from the cluster ID, each item in the cluster can be determined. In step 202, the central database recorded the identify of the truck that brought the cluster as well as the loading dock at which the cluster was received. In step 208, the database system recorded where the cluster is being stored. The central database has also recorded when the items were received, when they were stored and how long they spent in transit. The central database may also have received additional information from writeable fields on the tags that pertain to items in the cluster.

In step 210, a forklift with an interrogator will pick up the cluster of items from storage. In step 210, the forklift reads the tag on each item in the threshold number of items in the cluster of items and transmits the tag IDs read to the central database to verify that the cluster of items is, in fact, the correct cluster of items that the forklift was supposed to pickup. In step 214, the forklift transports the cluster to a staging location and deposits the cluster. Between the storage location and the staging location, the forklift reads the location tags embedded in the floor at key locations to provide a complete trail of the cluster of items. Accordingly, at step 214, the central database system has recorded which items have been removed from storage, that the storage location is now vacant and ready for use, the staging area where the items have been deposited, and also the times at which each of these events occurred.

Figure 7:
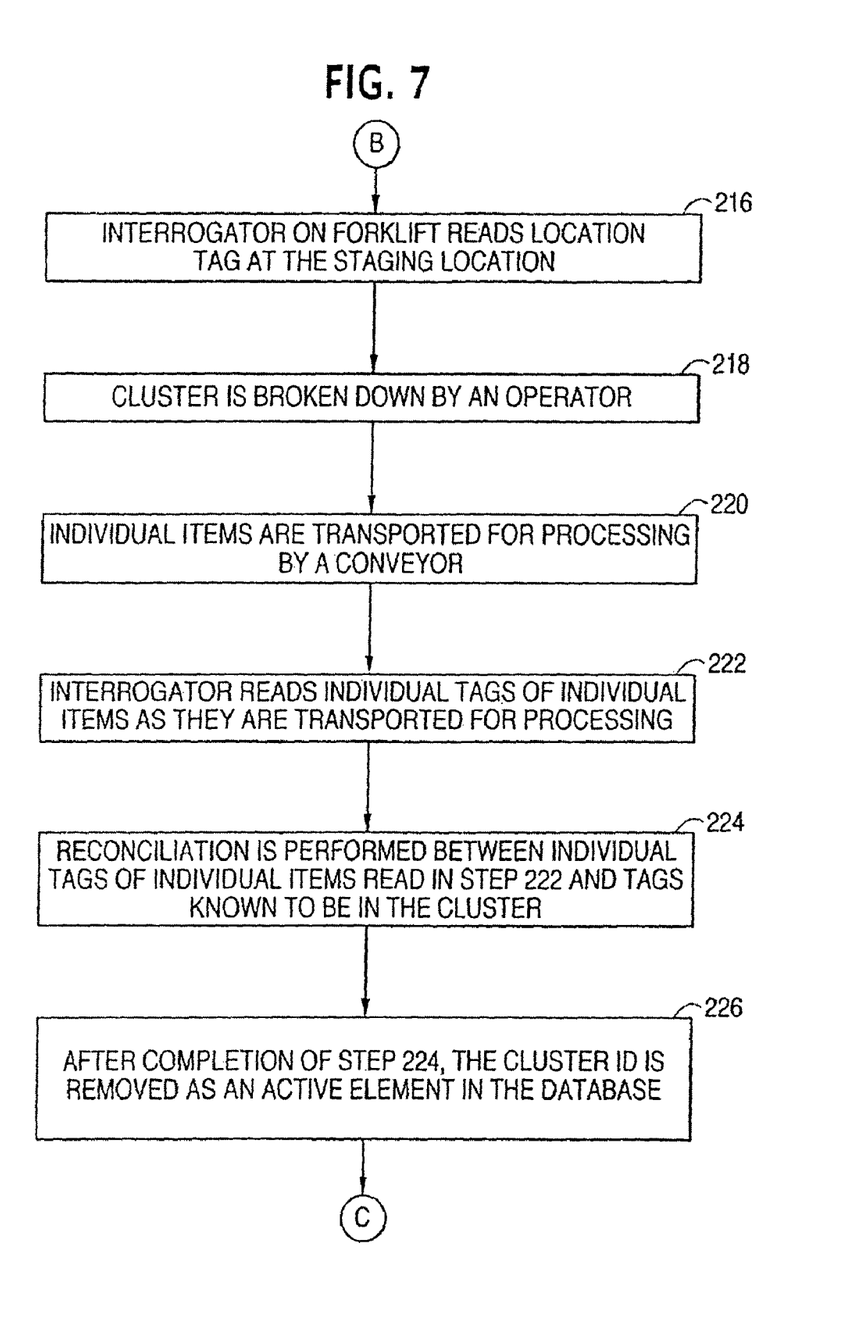

Referring to FIG. 7, an interrogator on the forklift reads the location tag at the staging location and transmits this information to the central database in step 216. In step 218, an operator at the staging location breaks down the cluster by opening the box, bag, crate or removing the stretch wrap from the pallet, and places the items on a conveyance for transporting for processing in step 220. In step 222, an interrogator reads individual tags of individual items as they are transported for processing. This information is then transmitted to the central database. In step 224, a reconciliation is made between the individual tags of individual items read in step 222 and the list of items for that cluster ID. This information is then forwarded to receiving, accounts payable, and other departments that require it. After completion of step 224, the cluster ID is removed as an active element in the database in step 226. The method then proceeds according to the flow chart of FIG. 8, which outlines steps in which a new cluster is formed.

Figure 8:
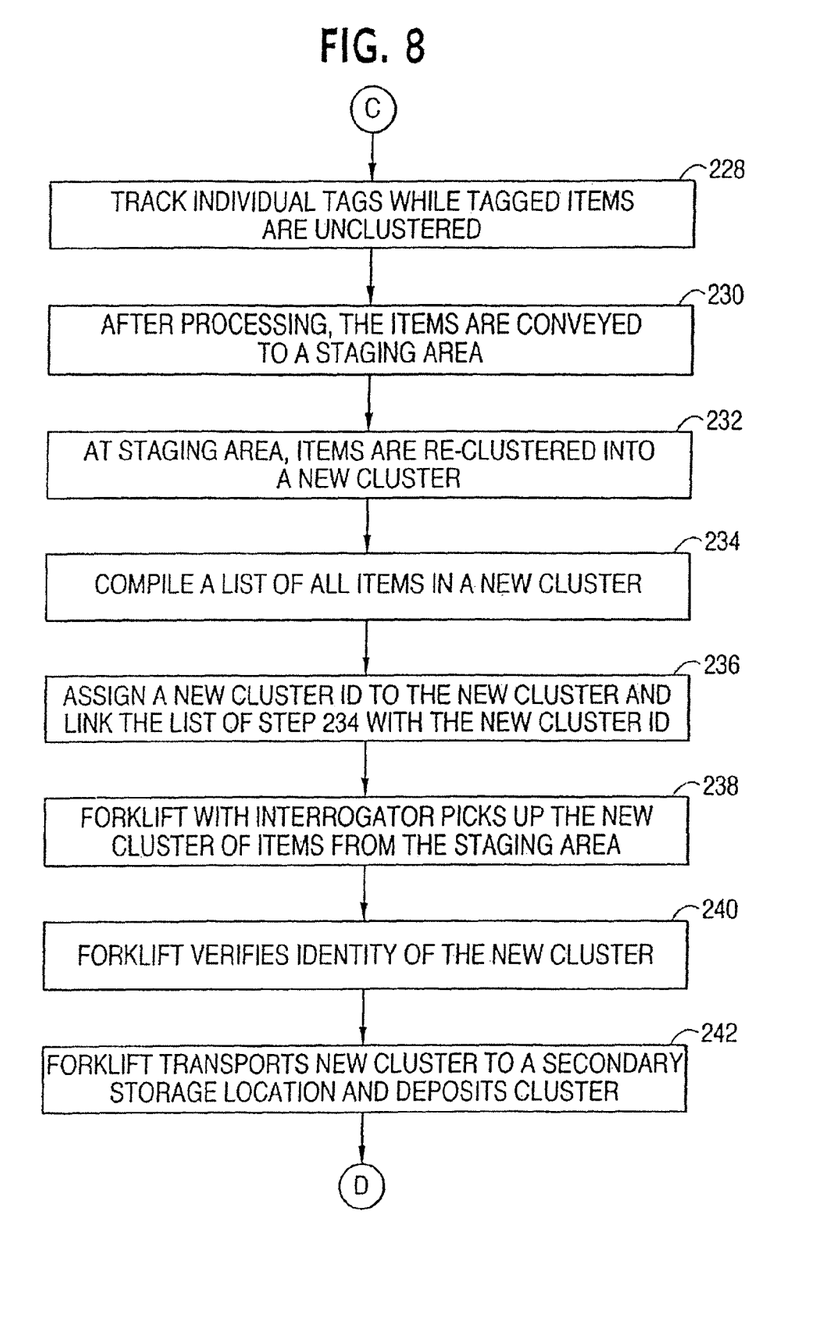
FIGS. 8 and 9 are flow charts illustrating subsequent steps of moving and tracking items after the steps of FIGS. 6 and 7 in accordance with a further preferred aspect of the invention.

Referring to FIG. 8, subsequent steps of moving and tracking items after the steps of the method of FIGS. 6 and 7 are illustrated by means of a flow chart. In step 228, the individual tags of the individual items are tracked while the tagged items remain unclustered. During this period, the individual items undergo further processing. After processing, the items are conveyed to a staging area in step 230. In step 232, the items are repackaged into a transport package container while at the staging area, and are thereby clustered into a new cluster— this new cluster is not necessarily composed of the same items as the old cluster. In step 234, a list of all of the items in the new cluster is compiled by reading the tags of all of the items added to the cluster. In step 236, a cluster ID is assigned to the new cluster and the list of step 234 is linked to the new cluster ID. A forklift with an interrogator then picks up the new cluster of items from the staging area in step 238. In step 240, the forklift reads the tag on each item in a threshold number of items in the new cluster of items, and transmits this information to the central database to verify that the new cluster of items is the correct new cluster of items. In step 242 the forklift transports the new cluster to a secondary storage location and deposits the cluster there. Between the staging area and the secondary storage location, the interrogator on the forklift is reading tags embedded in the floor at key locations to provide a complete trail that the items take between the staging area and the secondary storage location. After step 242, the central database has recorded an inventory of all items that have been processed and packaged. The central database has also recorded where the items were processed and packaged and are being stored, and when all of these operations took place.

Figure 9:
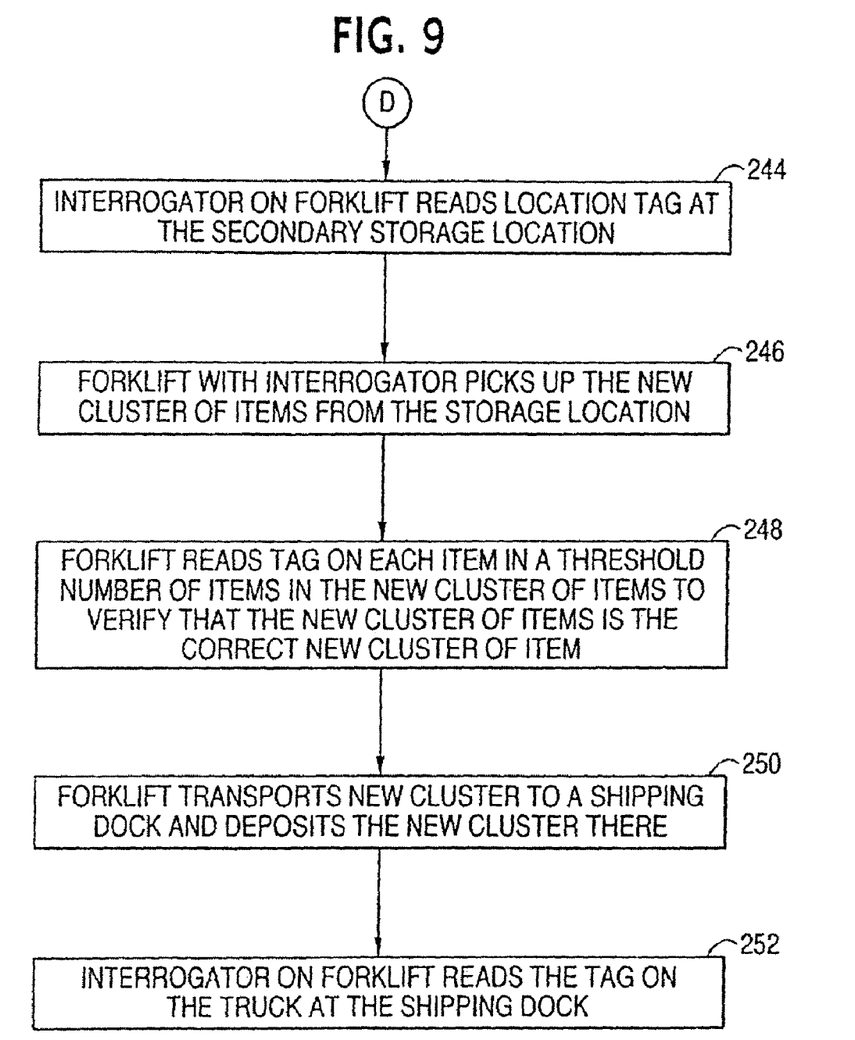

Referring to FIG. 9, the interrogator on the forklift reads the location tag at the secondary storage location and transmits this information to the central database in step 244. In step 246, a forklift with an interrogator picks up the new cluster of items from the secondary storage location. In step 248, the forklift reads the tag on each item in a threshold number of items in the new cluster of items, and then transmits this information to the central database to verify that the new cluster of items is in fact the correct new cluster of items. In step 250, the forklift transports the new cluster to a shipping dock and deposits the cluster at the shipping dock. Between the storage location and the shipping dock, the forklift reads a series of location tags embedded in the floor, the last location tag read being embedded in the floor of the shipping dock. In step 252, the interrogator on the forklift reads the tag of the truck that is receiving the new cluster of items, and the forklift then transmits this information to the central database. Accordingly, after step 252, the central database has recorded every item that has been shipped, as this information can be derived from the list of items for the new cluster of items. From the tag read in step 252, the central database has also recorded the identity of the truck on which the new cluster of items were loaded, as well as the shipping dock at which they were loaded. The central database has recorded which secondary storage locations are now vacant. Finally, the central database has recorded the times at which each reading of a tag took place, enabling the central database to determine secondary storage and shipping times. The central database may also include additional information that it read from the writeable fields of tags, where such writeable fields contain information regarding the tagged items.

By executing a real time method in accordance with an aspect of the invention, it is possible to track what has happened to each item and also when it happens. This assists in scheduling and routing flows throughout the facility. Even a very simple test such as reading tagged ID's of a threshold number of items in a new cluster of items that is being shipped and determining whether in fact the correct new cluster of items is being shipped from the correct shipping dock to the correct truck can save an enormous amount of time and money.

The present invention may be embodied in other specific forms without departing from the spirit or essential characteristics thereof. Certain adaptations and modifications of the invention will be obvious to those skilled in the art. Specifically, while much of the description of the present invention relates to the implementation of the invention in a warehouse, it will be apparent to those skilled in the art that the invention can be practiced in any context in which tagged items are grouped into clusters. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer-implemented method for tracking a cluster of items, comprising:
   receiving, at a computer, signals from a first subset of a plurality of identifiable items in the cluster of items, wherein at least each identifiable item in the first subset is associated with a tag configured to transmit an identifier of the associated identifiable item;
   determining a second subset of the plurality of identifiable items as included in the cluster based, at least in part, on the received signals from the first subset of the plurality of identifiable items, the second subset determined as included in the cluster independent of receiving signals from the second subset and different from the first subset; and
   identifying one or more records of the second subset of the plurality of identifiable items in response to at least the determination.

2. The method of claim 1, wherein each item of the cluster is associated with a tag configured to transmit a unique identifier of the associated item.

3. The method of claim 1, wherein at least the first subset of identifiable items are in an active range of a Radio Frequency IDentifier (RFID) reader.

4. The method of claim 1, further comprising:
   identifying a predefined threshold defining a minimum number of items in the first subset of the plurality of identifiable items; and
   determining a number of items in the first subset is greater than or equal to the predefined threshold prior to identifying the one or more records of the second subset.

5. The method of claim 1, further comprising:
   receiving a signal identifying a location of an associated location tag; and
   associating a location with the cluster of the items based, at least in part, on the location signal.

6. The method of claim 5, the location comprising a first location, the location tag comprising a first location tag of a plurality of identifiable location tags, further comprising:
   receiving a signal identifying a second location of an associated second location tag; and
   tracking movement of the cluster of items based, at least in part, on the first location and the second location.

7. The method of claim 1, each signal of the first subset comprising a cluster ID, each item of the cluster associated with the cluster ID.

8. The method of claim 7, wherein the one or more records of the second subset are identified in response to at least receiving the cluster ID a minimum number of times.

9. The method of claim 1, each tag comprises a passive Radio Frequency IDentifier (RFID) tag.

10. The method of claim 1, wherein identifying one or more records of a second subset comprises:
    identifying each item in the first subset of the plurality of identifiable items based, at least in part, on the received signals;
    determining a cluster ID of each item in the first subset of the plurality of identifiable items;
    identifying the second subset of the plurality of identifiable items based, at least in part, on the cluster ID; and
    processing records of the second subset of the plurality of identifiable items in response to at least identifying the second subset.

* * * * *

UNITED STATES PATENT AND TRADEMARK OFFICE
CERTIFICATE OF CORRECTION

PATENT NO. : 7,724,138 B2  Page 1 of 1
APPLICATION NO. : 11/966663
DATED : May 25, 2010
INVENTOR(S) : Clifford A. Horwitz and William E. Davidson It is certified that error appears in the above-identified patent and that said Letters Patent is hereby corrected as shown below:

Title Page
Item (75) Inventors: After "Clifford A. Horwitz,", delete "Ontario (CA)" and
insert -- Richmond Hill, Ontario (CA) --

Signed and Sealed this

Twenty-fourth Day of August, 2010

David J. Kappos
*Director of the United States Patent and Trademark Office*